Dec. 14, 1954 S. C. GRAHAM 2,697,041
ICE-CREAM CUP
Filed Feb. 2, 1953
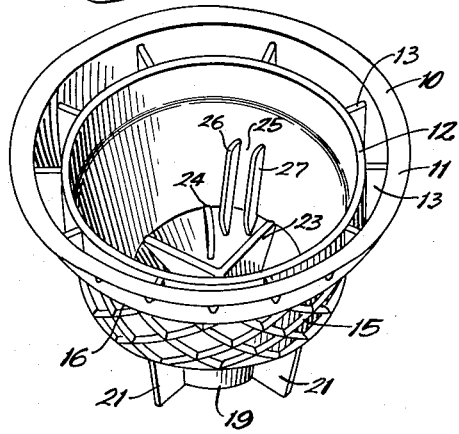
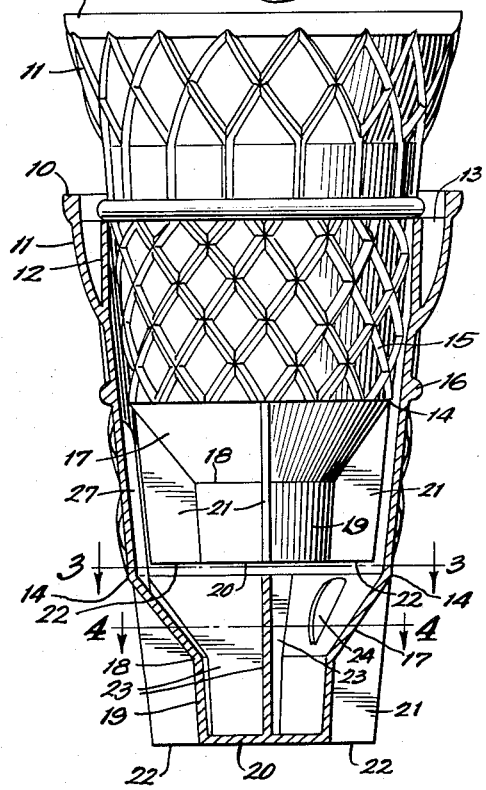
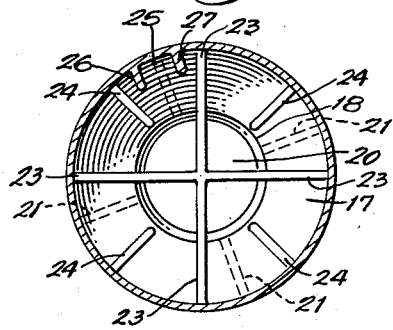
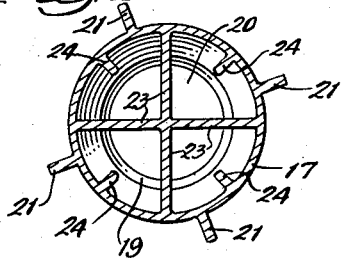
INVENTOR:
Seymour C. Graham,
BY
Orms, McDougall, Williams & Hersh,
ATTORNEYS.

ated Dec. 14, 1954

2,697,041

ICE-CREAM CUP

Seymour C. Graham, Chicago, Ill.

Application February 2, 1953, Serial No. 334,456

2 Claims. (Cl. 99—89)

This invention relates to confections usually classified as ice cream cups, and more particularly to such a cup having novel conformations which function in various ways to increase the utility thereof.

Early forms of ice cream cups were conical in shape and, whether formed as a flat pancake and rolled, or formed on a die in the conical shape, had the common fault that they would not stand alone in an upright position on a flat surface. An additional fault found in such cones was that they were prone to fracture during shipment because compressive loads were taken in compression and tension in such a way as to cause a high rate of destruction, when the cones are made of the usual extremely frangible baked confection.

Later ice cream cups were formed with a relatively flat bottom and slightly tapering sides in the manner of truncated cones.

It is an object of the present invention to provide an ice cream cup having a plurality of outside supporting and strengthening members adapted to support the loaded cup on a flat surface without employment of other supporting means.

A further object is to provide an ice cream cup having a plurality of inner baffles and supporting members adapted to strengthen the cup and position the frozen confection within the cup.

A further object is to provide an ice cream cup which may be employed to serve a hand held frozen confection which is partially covered by a flavoring syrup, the cup providing means for permitting the syrup to reach the bottom of the cup and not remain trapped on top of the frozen confection.

Further objects and advantages of my invention will be apparent from a consideration of the following specification in connection with the accompanying drawings, in which:

Fig. 1 is a view in perspective of an ice cream cup constructed according to this invention, Fig. 2 is a view of two of such cups in their stacked or shipping condition, the outer or lower cup being shown in section, and the inner or upper cup being shown in elevation, Fig. 3 is a view in section on the line 3—3 of Fig. 2, detailing the ribbed bottom construction of a completely formed cup, and Fig. 4 is a view similar to Fig. 3, being in section on the line 4—4 of Fig. 2, and detailing further the ribbed construction of a completely formed cup.

In the drawings the cup 10 is shown as having an upper bell portion 11 which is supported from the body portion 12 by the ribs 13. The body portion 12 extends substantially in a frusto-conical shape to its lower edge 14, the bell portion 11 and the body portion 12 being formed with the conventional strengthening waffle ribs 15. The upper edge of the body portion 12 presents an annular support adapted to engage the supporting rib 16 which is formed below the bell portion 11 and which carries the entire weight of the cup 10 as well as those above it. The bell 11 is not subjected to compressive forces by the stacked cups.

Below the edge 14 the body of the cup 10 is inwardly tapered at a much sharper angle, forming the portion 17 as a truncated cone which extends to the joint 18 below which the portion 19 extends in a slightly conical shape to the bottom panel 20.

The external fins 21 extend downward vertically from the edge 14 and radially outwardly from the portions 17 and 19. The lower edges 22 of the external fins 21 are in the plane of the bottom panel 20 and provide an effectively enlarged base whereby the loaded cup 10 will stand unsupported on a horizontal flat surface.

The internal ribs 23 are formed as a pair of planes perpendicular one to the other and having their common line on the axis of the cup 10. They extend from the area adjacent the edge 14 to the bottom 20. In this position the ribs 23 are slightly below the bottom 20 of a cup stacked above them, thereby giving suitable clearance and making certain that the weight of the cup is carried by the rib 16 on the upper edge of the body 12.

Additional internal strengthening ribs 24 extend from points adjacent the edge 14 downwardly to points adjacent the joint 18 and serve to strengthen further the wall 17. The ribs 23 and 24 cooperate to hold the frozen confection out of the vacant well and away from the bottom panel 20 until the confection becomes relatively liquid.

A syrup channel 25 is formed between the ribs 26 and 27, which extend from a point just below the supporting rib 16 to a point a short distance below the edge 14. Because of the proximity of the ribs 26 and 27 to each other the frozen confection will be prevented from sealing against the inside surface of the cup at this point and liquid material will be allowed to flow between the confection and the cup and enter the vacant well at the bottom of the cup.

Having described my invention, what I claim and desire to protect by Letters Patent is:

1. An edible receptacle for holding frozen confection, comprising an upper generally frusto-conical annular wall section tapering gradually downwardly and presenting a wide mouth at its upper end, a lower wall section joined to the lower end of said upper wall section and tapering downwardly substantially more sharply than said upper wall section, said lower wall section being closed at its lower end, a plurality of internal radial ribs in said lower section for preventing frozen confection from entering said lower section and thereby retaining said lower section vacant to receive melted confection and a plurality of upright radial fins formed externally on said lower section and having lower edges in a common plane, said fins thereby being effective to support said receptacle in upright position on a horizontal supporting surface, said ribs and said fins cooperating to reinforce said lower section, said fins having outer edges connected smoothly to said upper section and extending downwardly therefrom along the line of taper thereof, said receptacle thereby being adapted to nest snugly within another receptacle of the same kind with the outer edges of said fins of the inner receptacle extending parallel and in close proximity to the inner surface of the upper section of the outer receptacle.

2. An edible receptacle for holding frozen confection, comprising an upper generally frusto-conical annular wall section tapering gradually downwardly and presenting a wide mouth at its upper end, a lower wall section joined to the lower end of said upper wall section and tapering downwardly substantially more sharply than said upper wall section, said lower wall section being closed at its lower end, a plurality of internal radial ribs in said lower section for preventing frozen confection from entering said lower section and thereby retaining said lower section vacant to receive melted confection, a plurality of upright radial fins formed externally on said lower section and having lower edges in a common plane, said fins thereby being effective to support said receptacle in upright position on a horizontal supporting surface, said ribs and said fins cooperating to reinforce said lower section, said fins having outer edges connected smoothly to said upper section and extending downwardly therefrom along the line of taper thereof, said receptacle thereby being adapted to nest snugly within another receptacle of the same kind with the outer edges of said fins of the inner receptacle extending parallel and in close proximity to the inner surface of the upper section of the outer receptacle, and an additional pair of closely spaced ribs formed inside said upper section and extending upwardly from the lower end thereof part way toward the upper end thereof, said closely spaced ribs defining a channel therebetween for conducting melted confection from the upper part of said upper section into said lower section.

References Cited in the file of this patent

UNITED STATES PATENTS

| Number | Name | Date |
|---|---|---|
| 1,894,545 | Schoenfeld | Jan. 17, 1933 |
| 1,939,113 | Schoenfeld | Dec. 5, 1933 |
| 1,987,993 | Dicker | Jan. 15, 1935 |
| 2,087,068 | Pape | July 13, 1937 |
| 2,159,761 | Fredrickson | May 23, 1939 |
| 2,462,497 | Heyman | Feb. 22, 1949 |